(12) United States Patent
Meyers

(10) Patent No.: US 9,972,154 B1
(45) Date of Patent: *May 15, 2018

(54) METHOD AND APPARATUS FOR BIOMETRIC ACCESS FOR E-SEALS

(71) Applicant: GlobalTrak Acquisition, LLC, Rochelle Park, NJ (US)

(72) Inventor: Richard C. Meyers, Longboat Key, FL (US)

(73) Assignee: GlobalTrak Acquisition, LLC, Rochelle Park, NJ (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/735,122

(22) Filed: Jun. 9, 2015

Related U.S. Application Data

(63) Continuation of application No. 13/408,990, filed on Feb. 29, 2012, now Pat. No. 9,070,231.

(60) Provisional application No. 61/448,011, filed on Mar. 1, 2011.

(51) Int. Cl.
*G08C 19/00* (2006.01)
*G07C 9/00* (2006.01)

(52) U.S. Cl.
CPC ..... *G07C 9/00563* (2013.01); *G07C 9/00087* (2013.01)

(58) Field of Classification Search
CPC ........................... G06F 21/32; G07C 9/00158
USPC ........................................... 340/5.52
See application file for complete search history.

(56) References Cited

U.S. PATENT DOCUMENTS

| | | | |
|---|---|---|---|
| 6,420,971 B1 * | 7/2002 | Leck | E05B 39/04 340/542 |
| 2004/0041706 A1 * | 3/2004 | Stratmoen | G06Q 10/08 340/539.26 |
| 2008/0027756 A1 * | 1/2008 | Gabriel | A61B 90/90 705/2 |
| 2008/0087720 A1 * | 4/2008 | Levitov | G07F 9/06 235/379 |

* cited by examiner

*Primary Examiner* — Vernal Brown

(57) ABSTRACT

A system, method and apparatus for using electronic seals in container security systems is provided. According to the present invention, one or more biometric measurements may be used with an e-seal device to control access. In one preferred embodiment, the biometric signals received by an e-seal device may be transmitted to a remote monitoring station, and the remote monitoring station may wirelessly authorize access to a container.

11 Claims, 2 Drawing Sheets

METHOD AND APPARATUS FOR BIOMETRIC ACCESS FOR E-SEALS

PRIORITY CLAIM

The present invention claims priority to U.S. application Ser. No. 13/408,990 filed Feb. 29, 2012 which claims priority to U.S. Provisional Application No. 61/448,011 filed Mar. 1, 2011.

BACKGROUND AND FIELD OF THE PRESENT INVENTION

1. Field of the Present Invention

The present invention relates generally to container security and, more particularly, to a container security system in which biometric access to electronic seals is used as a method to ensure secure freight delivery by limiting access only to authorized personnel and/or at authorized time periods.

2. Background of the Invention

Containerized shipping is a critical component of international trade. About 90% of the world's trade is transported in cargo containers and almost half of incoming U.S. trade (by value) arrives by containers onboard ships. More than seven million cargo containers arrive on ships and are offloaded at U.S. seaports each year. As terrorist organizations have increasingly turned to destroying economic infrastructure to make an impact on nations, the vulnerability of international shipping has come under scrutiny.

The Container Security initiative (CSI) was launched in 2002 by the U.S. Bureau of Customs and Border Protection (CBP), an agency of the Department of Homeland Security. Under the CSI program, the screening of containers that pose a risk for terrorism is accomplished by teams of CBP officials deployed to work in concert with their host nation counterparts. Its purpose was to increase security for container cargo shipped to the United States. As the CBP puts it, the intent is to "extend the zone of security outward so that American borders are the last line of defense, not the first." The CSI consists of four core elements: using intelligence and automated information to identify and target containers that pose a risk for terrorism, pre-screening those containers that pose a risk at the port of departure before they arrive at U.S. ports, using detection technology to quickly pre-screen containers that pose a risk and using smarter, tamper-evident containers.

As of Oct. 15, 2008, the SAFE Port Act requires that all containers entering the U.S. from foreign ports of origin (including those from non C-TPAT members) must be secured with a high-barrier security seal that conforms to strength values as specified in the ISO/DIS 17712 Standard. One hundred sixty-six member countries of the World Customs Organization (WCO) have signed "The Framework of Standards to Secure and Facilitate Global Trade." Such seal integrity programs will be based on the use of a high-security mechanical seal as presented in ISO 17712 at the point of stuffing. The CBP will consider 6 U.S.C. 944 to be violated if loaded containers subject to the sealing requirements arrive by vessel at a port of entry in the United States on or after Oct. 15, 2008. The CBP may assess a civil penalty against the responsible party violating 6 U.S.C. 944 for the attempted introduction of merchandise into the United States contrary to law. Generally, ISO/PAS 17712 requires that container freight seals meet or exceed certain standards for strength and durability so as to prevent accidental breakage, early deterioration (due to weather conditions, chemical action, etc.) or undetectable tampering under normal usage. ISO/PAS 17712 also requires that each seal be clearly and legibly marked with a unique identification number.

DESCRIPTION OF RELATED ART

As new security requirements for international container trade are forcing changes in global supply chain processes, shippers look to advanced technology to enhance security and efficiency of their container logistics. Customs inspections at international borders, especially in maritime ports, are one of the biggest inefficiency factors, leading to delays and additional logistics costs. An electronic seal as an important part of a multi-layered security system has the ability to enhance the security as well as to improve the efficiency of container logistics.

RFID e-seals are typically either active or passive. A passive seal relies on a signal from the reader to activate the e-seal from a period of inactivity and electronically prompts the unit to transmit its information. This information can include the e-seal identification number; time and date when the seal was affixed; whether the seal has been tampered with; and the time of any event that occurred since the seal was activated. These e-seals tend to be short-range and directional because they rely on the power from readers. Because a passive e-seal does not require a constant power source, it can usually be operated for an extended period of time with batteries. The batteries power the signal transmission when the seal is interrogated by a reader. They also keep an internal clock running, run internal checks, and log any events. E-seals powered by batteries can have a signal range of up to 30 meters.

Active e-seals have the same capabilities as passive seals, but they can also initiate transmissions. The advantages of using this kind of seal include a much greater range of up to 100 meters and a much stronger signal, which allows the signal to be transmitted around and beyond minor obstructions. Active e-seals cost more because of their enhanced capabilities and the number of batteries needed to power them. These seals also have greater maintenance costs because of the requirement to more frequently replace the batteries.

Several different examples of patented electronic seals available today are: the GlobalTrak e-seal combining a covert Assist GPS tracking and sensing device, the Hercules e-seal which is ISO 17712 compliant for cross border use; the Hyperion e-seal which is for domestic use only and the Hercules Padlock e-seal which combines a padlock to the electronic seal for multiple uses domestically. Remote sensor options are available as add-ons to manage conditioning of the asset.

A GlobalTrak e-seal combines a covert Assisted GPS tracking & sensing device with an electronic seal that can be fixed to any locking aperture. When a seal is compromised, the GlobalTrak device sends event and location information immediately to the stakeholderWeb based with real time (24/7) notification when an event occurs during transport/storage. No infrastructure is required. The GlobalTrak e-seal uses 2-way Quad-Band GSM cellular with high sensitivity Assisted (A-GPS) allowing the Covert unit to be easily installed including inside the asset or buried within cargo (pallet) in combination with 2.4 GHz. Zigbee™ Wi-Fi protocol. Compliant to IEEE 802.15.4 standard. Provides URL allowing stakeholders to visually track the asset in real time with immediate notification of an event over the net to a PC and/or PDA as an email. The system has an Information Management Bureau (1 MB) that displays, analyzes and transmits data to the stakeholder(s) on demand. Re-usable electronics with the tracker and seal makes the system economical.

The patented Hercules Zigbee re-usable-seal tag is a combination of both high security mechanical and electronic protection that contains Zigbee Wi-Fi technology. When the seal is breached it sends a real-time signal to the GPS tracker in the conveyance and to the stakeholder for immediate action. There are two versions, one that is ISO 17712/C-TPAT compliant for cross border and the other with a padlock attachment for total re-usability when multiple stop-offs are required. The padlock version is for domestic use only. The RFID system is a wireless identification system container RFID reader, tags, and local software. The Hercules e-seal electronically secures ocean containers, trailers, rail cars and air cargo containers. The tamper signal is transmitted when attempt is made to violate the seal.

The patented Hyperion Zigbee re-usable e-seal tag is a combination of a plastic indicative and electronic protection that contains Zigbee Wi-Fi technology that communicates with the GPS Tracker. The electronic portion of the seal is reusable and the specially designed strap is disposable and needs to be replaced for each trip. The strap functions like a circuit and when breached sends a signal to the GPS tracker in the conveyance which then is sent to the stakeholder in real time for immediate action. This product used by itself is not ISO 17712 compliant.

E-seals are transponders that can be used by shippers and enforcement agencies desiring to track shipments and that can also help determine shipment status and shipment integrity. E-seals can report their positions and are able to record the time that they were activated, compromised, or removed. E-seals are electronic replacements for common mechanical container door seals and use the locking bar on the container's back door.

Generally, e-seals are attached to the container's door locking bar by inserting a locking pin into the transponder (seal body) that can only be removed by cutting the pin. The problems addressed in the present invention have to do with this stage of the life of an e-seal. Although the most advanced e-seals can alert a stakeholder when a seal is compromised this has not halted the breech in security. Once the e-seal is breached it can be easily discarded and no further evidence can be retrieved from the transponder. Anyone can easily cut the e-seal away. Currently, there is no system in place to ensure that the container is only accessed by authorized personnel.

SUMMARY OF THE PRESENT INVENTION

To address the problems and limitations noted above, the present invention provides a tamper-evident smart c-seal device capable of limiting unauthorized access.

According to one aspect, the smart e-seal device of the present invention is a container security device that may be snapped into place in the doorjamb of an existing container without any special tools. After loading, the shipper accesses the system, logs in an access code, registers the container number, authorizes sealing the container and uploads voice files. The system generates an entry that gives the time, date, and seal number. Afterwards, the container's security device can be queried by anyone with access to the system. The container security device transmits information to a receiver or "reader." The reader, which is no bigger than a pack of matches, can be attached to any cell phone with global capability. In response, the device will generate a "data log" that records every time the device has been electronically queried and each time the door has been opened and resealed. A checking device or "checker," which does not require a cell phone, can also be used to check the seal's status. The "checker" indicates only whether the container has been opened, sort of a red-light, green-light system. Non-portable hard-wired readers are also placed at port cargo gateways to monitor the security devices. At its destination or any intermediate point, an authorized person can transmit a vocal access signal and open the container. The vocal access signal may be transmitted orally, via a PDA (Personal Digital Assistant), recorded voice patterns or any audible reproduction of the vocal pattern from the voice file.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
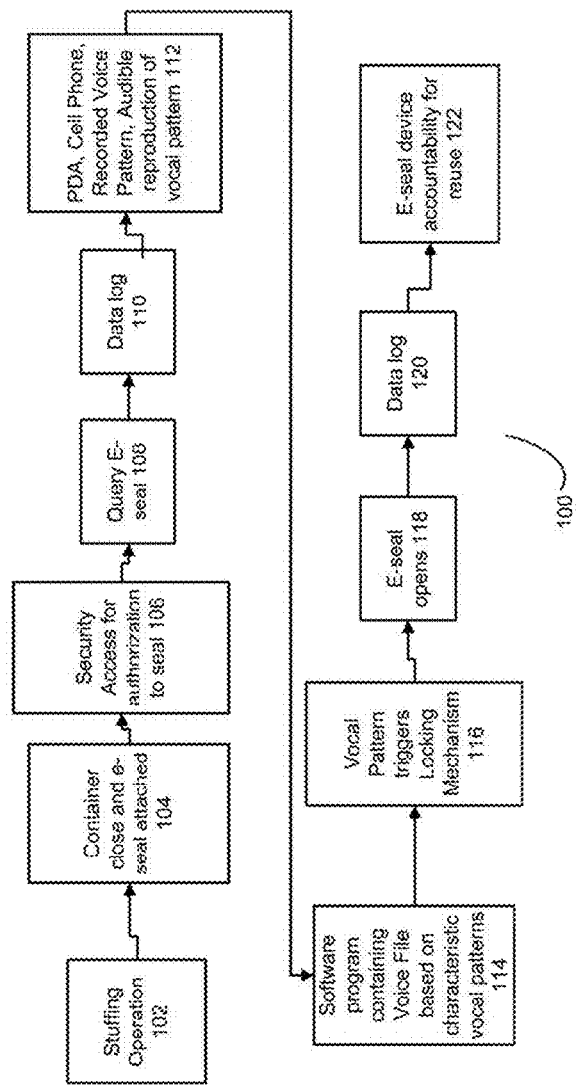
FIG. 1 is a block diagram of a method of employing a smart voice recognition e-seal device in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

With reference now to FIG. 1, a block diagram of a method of employing a smart voice recognition c-seal device in accordance with an embodiment of the present invention will now be discussed. As shown in FIG. 1, a method of accessing an e-seal using voice recognition to prompt receiver to enter voice command according to a preferred embodiment of the present invention 100. After stuffing a container 102, the shipper will close container and attach a smart voice recognition e-seal device 104. The shipper accesses the system, logs in an access code, registers the container number, authorizes sealing the container and uploads voice files 106. The system generates an entry that gives the time, date, and seal number. Afterwards, the container's security device can be queried by anyone with access to the system 108. The container security device transmits information to a receiver or "reader." The reader, which is no bigger than a pack of matches, can be attached to any cell phone with global capability. In response, the device will generate a "data log" that records every time the device has been electronically queried and each time the door has been opened and resealed 110. A checking device or "checker," which does not require a cell phone, can also be used to check the seal's status. The "checker" indicates only whether the container has been opened, sort of a red-light, green-light system. Non-portable hard-wired readers are also placed at port cargo gateways to monitor the security devices. At its destination or any intermediate point, an authorized person can transmit a vocal access signal and open the container 112. The vocal access signal may be transmitted orally, via PDA, through recorded voice patterns or any audible reproduction of the vocal pattern from the voice file. The voice recognition technology of the present invention includes a software program containing voice files based on characteristic vocal patterns 114. The vocal pattern of an authorized user may trigger the e-seal locking mechanism to open 118. Again, the device may generate a data log 120 whenever the e-seal is opened. Preferably, when removing the e-seal of the present invention it may be required that the e-seal is accounted for within a supply chain in order that the device is reused 122.

Alternatively, to make sure the same e-seal device is re-applied to the same container after the container is opened during shipment, the e-seal is preferably programmed to verify pairing of the e-seal and the container using the registered container number. Accordingly, when the operator re-applies the e-seal, the e-seal may prompt the operator to enter the current container number. If, for example, the container number does not match the registered container number, the e-seal may warn the operator and request that the operator re-enter the container number or access code. If the operator cannot resolve the discrepancy, an alarm may be reported to the remote monitoring station. For a smart container, the verification process may be processed through the container's security monitoring system when the e-seal is applied. For example, the e-seal may automatically signal the container security system and exchange the registered container number information. Thereafter, if the container number matches, the c-seal may signal the operator that the c-seal is successfully activated. Otherwise a visible and/or audible alarm may signal the operator for further action.

Figure 2:
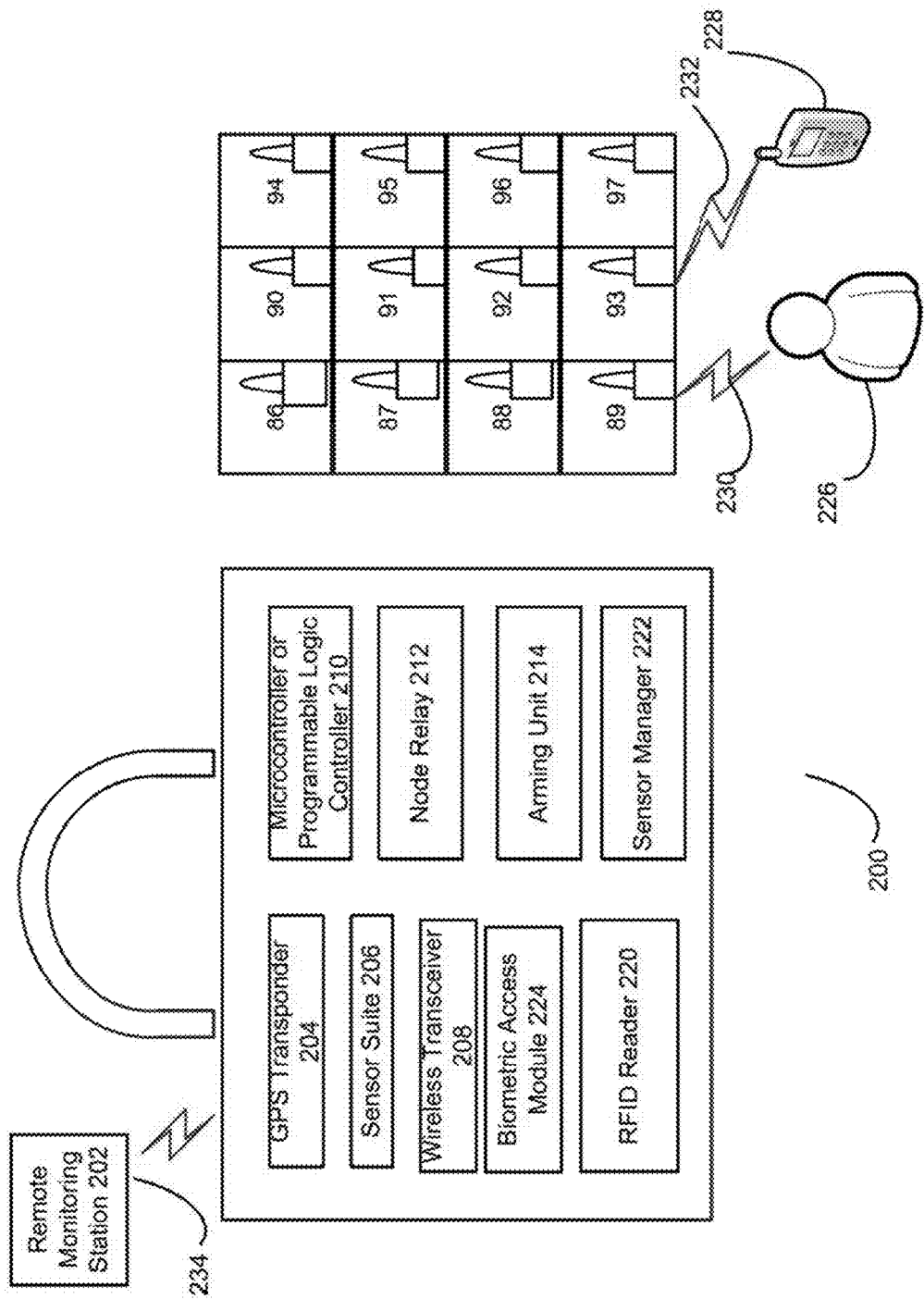
FIG. 2 shows a block diagram of an e-seal in accordance with an embodiment of the present invention.

With reference now to FIG. 2, a block diagram of an example of an e-seal in accordance with an embodiment of the present invention will now be discussed. As shown in FIG. 2, a smart e-seal monitoring device with biometric module 200 according to a preferred embodiment of the present invention including a GPS Transponder 204, an expandable sensor suite 206, a wireless transceiver 208, Programmable Logic Controller (PLC) 210, relay node 212, alarming unit 214, RFID reader 220, a Sensor Manager 222 and a Biometric Access Module 224. Preferably, the present invention may be easy to use while limiting access to only authorized personnel. The apparatus of the present invention 200 provides a means for a voice activated release mechanism so that the transponder of the e-seal is released from a secure attachment allowing the e-seal to be removed from the locking bar and the container to be accessed by an authorized entity 226 or via PDA 228. The means of authorized access may be delivered via recorded voice, over cell phone, or by an actual voice command. As further shown in FIG. 2, twelve cargo containers stacked in three rows and numbered 86-97 each secured with the apparatus of the present invention 200. The authorized receiver 226 sent to retrieve the contents of cargo containers may speak a predetermined naming word or phrase as a voice activating code to break the e-seal locking mechanism and easily retrieve cargo 230 or transmit a predetermined naming word or phrase 232 via a PDA device 228.

As shown in FIG. 2, the e-seal will detect voice command and transmit the voice command to a Remote Monitoring Station 202. In this embodiment the authorization and command to disarm the e-seal and release the locking mechanism will be received from the Remote Monitoring Station. In another embodiment of the present invention, the smart e-seal device of the present invention contains the voice files and vocal character recognition software capable of automatically triggering the e-seal to disarm and release the locking mechanism. After disarming, an c-seal may check all sensors, run self-diagnosis, and time-date stamp disarming event.

Preferably, additional Biometrics recognition means may also be used to layer the security of the e-seal. Preferably, further methods of recognizing a person based on a physiological or behavioral characteristic may be incorporated with the present invention. In addition to the voice, the possible features measured are the face, the fingerprints, hand geometry, handwriting, the iris and the retinal vein. Shipping companies may use a combination of biometric measures for authentication of authorized personnel or a combination of measures selected from biometric measures and non-biometric measures to increase the level of security provided by the present invention.

According to a further preferred embodiment, multiple security levels may be used to manage the alarm settings of the c-seal device. In this embodiment, the particular security level may be determined by the remote monitoring system or selected by the c-seal device itself. For example, a remote monitoring system may keep track of the location or the status of the shipping container during its shipping journey, and the remote monitoring system may send commands to the c-seal for entering different security levels as appropriate. For instance, the remote monitoring system may increase the e-seal security level when a cargo ship is ready to leave for a US port, or reduce the e-seal security level when the container has been delivered.

Further, the security level of the e-seal may be managed using location data and the presence of established geo-zones. The concept of using geo-zones is disclosed in U.S. application Ser. No. 13/345,414 which is hereby incorporated by reference. According to this aspect of the present invention, the security levels may be adjusted according to the determined safety of the present location of the container. For example, at highest security level, the e-seal may require an access code (or a RFID access identification) and one or two additional biometric measures. At lower level security status, one biometric measure or an access code may be sufficient.

What is claimed is:

1. An electronic seal apparatus for providing container security, the apparatus comprising:

an access control element, wherein the access control element is configured to receive a user input and further comprises one or more biometric security measures;
a data recording element, wherein the data recording element is configured to record data regarding selected events;
a digitally programmed locking device; and
a microcontroller coupled with the access control element and the digitally programmed locking device, wherein the microcontroller is capable of determining an authorized access and disarming the digitally programmed locking device accordingly; further wherein the access control element is configured to allow access using a first set of biometric security measures based on a first detected location and on a second set of biometric security measures based on a second detected location, wherein the first and second sets of biometric security measures are not the same, further wherein the second set of security measures includes a biometric security measure not included in the first set of biometric security measures.

2. The apparatus of claim 1, wherein the one or more biometric security measures include voice recognition.

3. The apparatus of claim 2, wherein the apparatus further comprises a wireless communication element configured to communicate with a remote monitoring station.

4. The apparatus of claim 3, wherein the apparatus is communicatively coupled with a container monitoring system, and further wherein the apparatus and the container monitoring system are paired using a container identification number.

5. The apparatus of claim 4, wherein the container identification number is verified when the apparatus is re-activated after unlocking.

6. The apparatus of claim 5, wherein the apparatus is configured to operate in one or more security modes, further wherein, according to at least one security mode, the microcontroller is configured to disarm the apparatus if a voice recognition authorization process is successful.

7. The apparatus of claim 6, wherein the microcontroller is configured to change the security level of the apparatus according to location information received from a shipping container.

8. The apparatus of claim 1, wherein the microcontroller is configured to change the security level of the apparatus according to a command from a remote monitoring station.

9. A method for providing a high degree of container security and a convenient authorization process using a biometric enabled e-seal device, the method comprising:
   initializing the e-seal device;
   logging in an access code; registering a container number; activating the e-seal device;
   generating an entry with a time, a date, and a seal number; recording the entry in a memory module in the e-seal device; uploading a biometric file;
   enabling a biometric authorization process based on the biometric file;
   detecting a user operation to start a biometric authorization process;
   receiving a biometric signal;
   comparing the biometric signal with the biometric file in the e-seal device;
   granting access and generating entry data upon the successful authorization and
   changing the security mode of the e-seal device based on location data, wherein the security mode is configured to allow access based on a first set of biometric security measures based on a first detected location and on a second set of biometric security measures based on a second detected location, wherein the first and second sets of biometric security measures are not the same, further wherein the second set of security measures includes biometric security measures not included in the first set of biometric security measures.

10. The method of claim 9, further comprising:
changing the security mode of the e-seal device based on a message from a monitored container.

11. The method of claim 9, further comprising:
changing the security mode of the e-seal device based on a command from a remote monitoring station.

* * * * *